United States Patent [19]
Sheffer

[11] Patent Number: 5,101,194
[45] Date of Patent: Mar. 31, 1992

[54] PATTERN-RECOGNIZING PASSIVE INFRARED RADIATION DETECTION SYSTEM

[76] Inventor: Eliezer A. Sheffer, 23 Coronet La., Plainview, Long Island, N.Y. 11803

[21] Appl. No.: 564,380

[22] Filed: Aug. 8, 1990

[51] Int. Cl.$^5$ .............................................. G08B 13/18
[52] U.S. Cl. .................................. 341/567; 250/221; 250/338.1; 250/340; 250/395
[58] Field of Search ............. 340/567; 250/340, 338.1, 250/395, 221

[56] References Cited
U.S. PATENT DOCUMENTS

| | | | |
|---|---|---|---|
| 4,263,585 | 4/1981 | Schaefer | 340/567 |
| 4,799,243 | 1/1989 | Zepke | 340/567 |
| 4,912,748 | 3/1990 | Horii et al. | 340/567 |

*Primary Examiner*—Glen R. Swann, III
*Attorney, Agent, or Firm*—Weiser & Stapler

[57] ABSTRACT

A passive infrared radiation (PIR) detection system permits data developed by the PIR detection system to be interpreted, to in essence "look into" a protected area and to positively determine the character of any images detected in the protected area. The system includes an array of PIR detectors for monitoring defined zones of the region to be protected. The array of PIR detectors is contained within an enclosure which is further provided with a lensing system which permits the several PIR detectors to monitor respectively assigned zones of the protected region from a single vantage point. The array of PIR detectors operates to develop a series of electrical signals which are then passed on for further processing and interpretation in accordance with various prescribed tests (criteria) which operate to distinguish between an intruder and other legitimate images capable of exciting the PIR detection system.

28 Claims, 4 Drawing Sheets

PATTERN-RECOGNIZING PASSIVE INFRARED RADIATION DETECTION SYSTEM

BACKGROUND OF THE INVENTION

The present invention relates generally to the field of security systems, and more particularly, to an improved passive infrared radiation detection device of the type commonly used in conjunction with such security systems.

It is presently common practice for state of the art security systems to incorporate not only a so-called "outer perimeter" comprised of appropriate switching devices for detecting access through openings (e.g., door, window, etc.) of a protected premises, but also one or more devices stationed within the premises to detect intruders which may have been successful in penetrating the outer perimeter of the security system. These are often referred to as "motion detectors", and include any of a variety of available devices for detecting motion within a defined region.

One such device which has found broad acceptance and applicability to the detection of motion within a defined region of a premises is the "passive infrared radiation" detector (hereafter referred to as a "PIR" detector) which, as its name suggests, is capable of detecting levels of infrared radiation. These detected levels of infrared radiation can then be interpreted to identify movements within the defined region. A PIR detection system of this general type, consisting of a PIR detector and preamplifier circuit, may be obtained commercially from suppliers such as Ademco and Racal, among others.

Considering their intended use (i.e., in a security system), much effort has been expended in improving the reliability of such state-of-the-art PIR detection systems by improving their immunity to noise and their ability to distinguish between valid and false alarms. Specifically, extensive efforts have been made to remove contributing, internally generated disturbances such as "popcorn" noise, or external radio frequency interference, and other types of electronic noise, through appropriate improvements in circuit design. While these improvements have significantly increased the reliability of such devices, the potential for further noise suppression (and improved "catch" sensitivity in detecting an intruder) is rather limited, and only marginally cost effective. Consequently, the overall quality of available PIR detection systems (dictated to a large extent by the measures available to improve noise rejection and increase sensitivity) has reached somewhat of a plateau in terms of performance.

Another problem which has been encountered in using state-of-the-art PIR detection systems is their limited ability to distinguish between a valid object to be detected (i.e., an intruder) and other "legitimate" images which may come to be detected such as pets or even rodents, light and heat sources present in the monitored region, or even the flashing headlights of automobiles, among others. Interesting to note is that even if it would be possible to further improve the noise rejection and "catch" sensitivity of the PIR detection system, false alarms could still not be entirely eliminated due to the inability of the PIR detection system to distinguish between an intruder and other, legitimate images present in the region that is being monitored.

It therefore became desirable to develop a new approach toward the improvement of a passive infrared radiation detection device which would not only serve to further suppress noise and improve sensitivity, but which would also assist in better identifying intruders to reduce false alarms.

SUMMARY OF THE INVENTION

It is therefore the primary object of the present invention to provide an improved passive infrared radiation (PIR) detection device.

It is also an object of the present invention to provide an improved PIR detection device which not only exhibits a significant improvement in noise suppression and "catch" sensitivity, but which is also better able to distinguish between intruders and legitimate objects, thereby avoiding false alarms.

It is also an object of the present invention to provide an improved PIR detection device having the foregoing capabilities, yet which is practicable and cost effective in operation.

These and other objects are achieved in accordance with the present invention by providing a system for processing information received by a PIR detection device in a manner which permits the data developed by the PIR detection device to be "interpreted", to in essence "see into" the protected area and to positively determine the character of any "images" detected in the protected area. The employed processing is interpretive, digital in nature, and virtually independent of the absolute (analog) voltage levels which are received at the PIR detection device. Thus, issues of critical circuit design to suppress noise are effectively eliminated. What is more, such processing permits a positive differentiation between persons (i.e., an intruder) and other detected images such as those produced by pets or possibly rodents, lights and existing heat sources in the region being monitored, or even lights from automobiles which may pass a window of the monitored region and come to be received by the PIR detection device.

The system of the present invention is generally configured to interact with an array of PIR detectors, to monitor defined "zones" of a region to be protected. The array of PIR detectors is contained within an enclosure which is further provided with a "lensing system" which permits the several PIR detectors to monitor respectively assigned zones of the protected region from a single vantage point.

In operation, each PIR detector of the array operates to receive levels of infrared radiation detected in its corresponding zone of the region which is to be monitored, developing a series of electrical signals which are then passed on for further processing by the system. Following amplification and conversion to digital form, the developed data is then introduced to a microprocessor which, in accordance with the present invention, establishes in memory a stored matrix for interpretation in accordance with various prescribed tests (criteria) which operate to distinguish between an intruder and other, legitimate images capable of exciting the PIR detection device. Repeated samplings are preferably sequentially stored within the microprocessor to develop serial "snapshots" of the region to be monitored, in turn providing an ongoing indication of the status of the region and providing still further information for distinguishing between intruders and other legitimate images. Such processing operates to provide the degree of differentiation which is desired in accordance with the present invention, while effectively eliminating the considerations of noise rejection and "catch" sensitivity which were limiting the performance of previously available PIR detection devices.

For further detail regarding a preferred system produced in accordance with the present invention, reference is made to the detailed description which is provided below, taken in conjunction with the following illustrations.

Brief Description of the Drawings

In the several views provided, like reference numbers denote similar structure.

DETAILED DESCRIPTION OF THE PREFERRED EMBODIMENT

Figure 1:
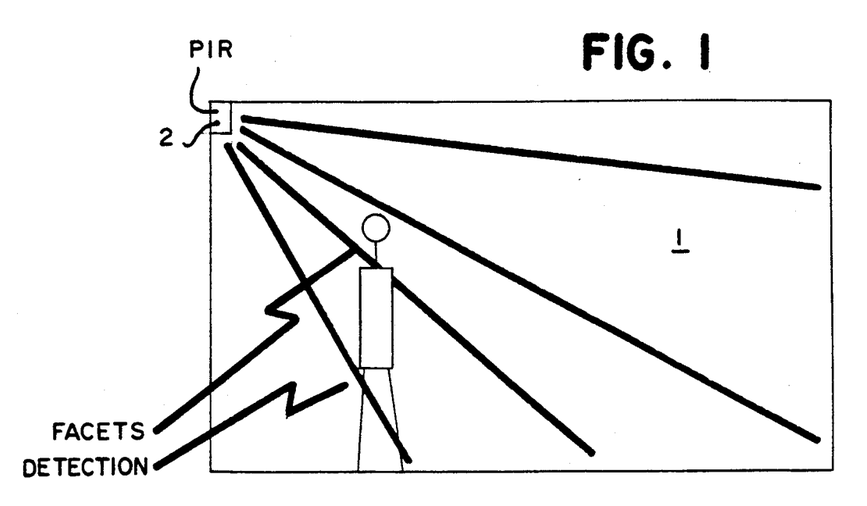
FIG. 1 is a schematic view of a region to be protected by the security system of the present invention.

FIG. 1 schematically illustrates a protected region, such as a room 1, which has been provided with a passive infrared radiation detection device 2 (hereinafter referred to as a "PIR" detection device) for motion detection purposes. Placement of the PIR detection device 2 will, of course, depend upon the configuration of the room 1 as well as other design considerations such as the availability of electrical wiring and aesthetics.

Generally speaking, and referring now to FIG. 2 of the drawings, the PIR detection device 2 employs an array 3 of PIR detectors 4, details of which will be more fully described below. Such arrays are commercially available from the Pennwalt Corporation (Keynar Piezo Film Department), and have previously been used for other purposes.

However, in accordance with the present invention, the array 3 of PIR detectors 4 has been adapted to separately receive incident radiation from the otherwise conventional "lensing" system of a PIR detection device, which was previously used to sub-divide the room 1 into a plurality of segments which could then be monitored by the single PIR detector associated with the device. However, unlike these previously available PIR detection devices, which made use of the segmented lens to direct incident radiation to a single point (the location of the single PIR detector), the PIR detection device 2 of the present invention makes use of the segmented lens to separately direct incident radiation to each of the several PIR detectors 4 forming the array 3. This is accomplished by providing a lensing system 5 which, in addition to the segmented lens 6, further includes a compensating mirror 7, as follows.

In operation, incident radiation 8 received from the room 1 will first come into contact with the segmented lens 6, in usual fashion. However, in accordance with the present invention, the compensating mirror 7 is positioned to deliver incident radiation received by the PIR detection device 2 to the array 3 of PIR detectors 4. In so doing, the segmented lens 6 and the compensating mirror 7 cooperate to direct this incident radiation along a series of paths which differ in accordance with the particular region of the room 1 which is being monitored, rather then focusing all incident radiation on a single point. This operation of the segmented lens 6 is best illustrated with reference to FIGS. 2 and 3 of the drawings, as follows.

Figure 2:
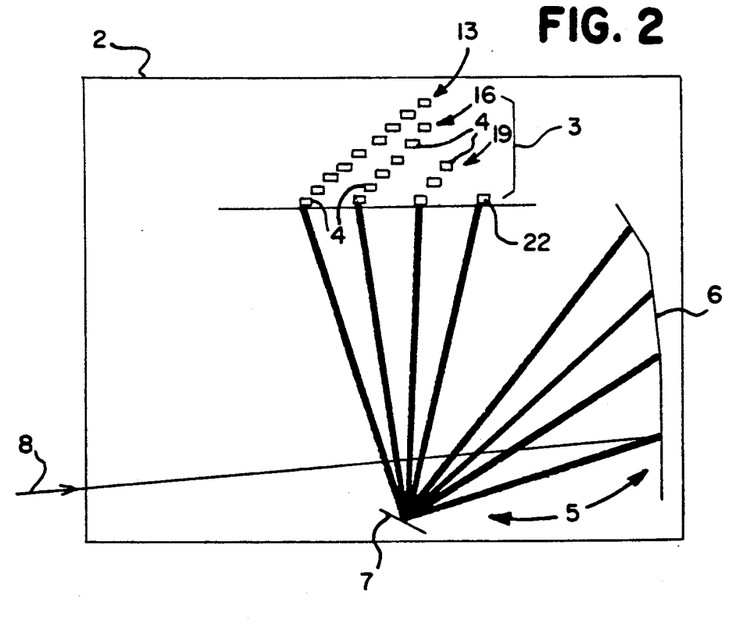
FIG. 2 is a schematic view of a passive infrared radiation detection device produced in accordance with the present invention.
Figure 3:
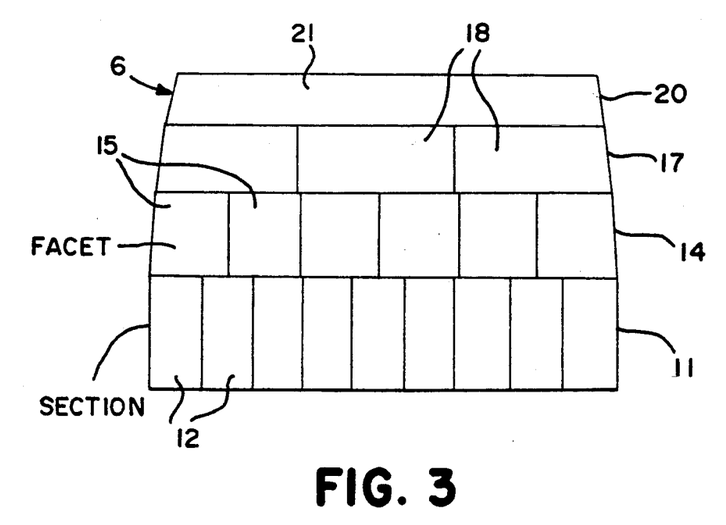
FIG. 3 is a plan view of the segmented lens of the passive infrared radiation detection device of FIG. 2.

In the illustrative embodiment of FIGS. 2 and 3, a lower-most section 11 of the segmented lens 6 is sub-divided into nine facets 12 positioned at angles which will cause infrared radiation detected along the floor of the room 1 to be directed to a corresponding array 13 (FIG. 2) of PIR detectors 4. Additional lens sections 14, 17, 20 are provided with additional series of facets 15, 18, 21 for achieving a similar result for other regions of the room 1. For example, the intermediate section 14 is sub-divided into six facets 15 which are configured to deliver incident radiation to its corresponding array 16 of PIR detectors 4. The intermediate section 17 is sub-divided into three facets 18 for delivering incident radiation to its corresponding array 19 of PIR detectors 4. The upper section 20 forms a single facet 21 for delivering incident radiation to a corresponding PIR detector 22.

It will be noted that the sections 11, 14, 17, 20 are provided with fewer corresponding facets progressing from the bottom of the room 1 to the top of the room 1. This is presently preferred since it is common for more "information" regarding movement within the room to be present along its floor, rather than along its ceiling. However, this specific configuration for the segmented lens 6 may be freely varied according to the particular application which is involved, including different room configurations as well as different placements within a particular protected area.

As a result of the foregoing, incident radiation received from the room 1 will come to be reflected by the segmented lens 6 and the compensating mirror 7 to the several PIR detectors 4 comprising the array 3. This will, in essence, operate to separate the room 1 into nineteen "zones" (in the illustrative embodiment) corresponding to the nineteen PIR detectors 4 of the array 3. Incident radiation resulting from an ongoing stimulus (i.e., a lamp or heat source) will constantly be reflected back to the associated PIR detector of the array as time progresses, providing a continuous stimulus to one or more of the PIR detectors 4 of the array 3. Incident radiation resulting from a moving object will be reflected by different facets of the segmented lens 6 as the object moves through the room 1, providing a varying stimulus to different PIR detectors 4 of the array 3.

Electrical signals are then developed responsive to these various stimuli, for application to a microprocessor 25 for signal processing purposes. To this end, and referring now to FIG. 4 of the drawings, the several PIR detectors 4 comprising the array 3 are electrically connected to a corresponding series of preamplifiers 26, which essentially serve as a buffer. This is then followed by an amplification (amplifiers 27), for eventual application of the developed signals to the microprocessor 25. Within the microprocessor 25, these developed signals are then subjected to testing to determine if the detected levels of incident radiation constitute a valid signal which should lead to the sounding of an alarm.

Figure 4:
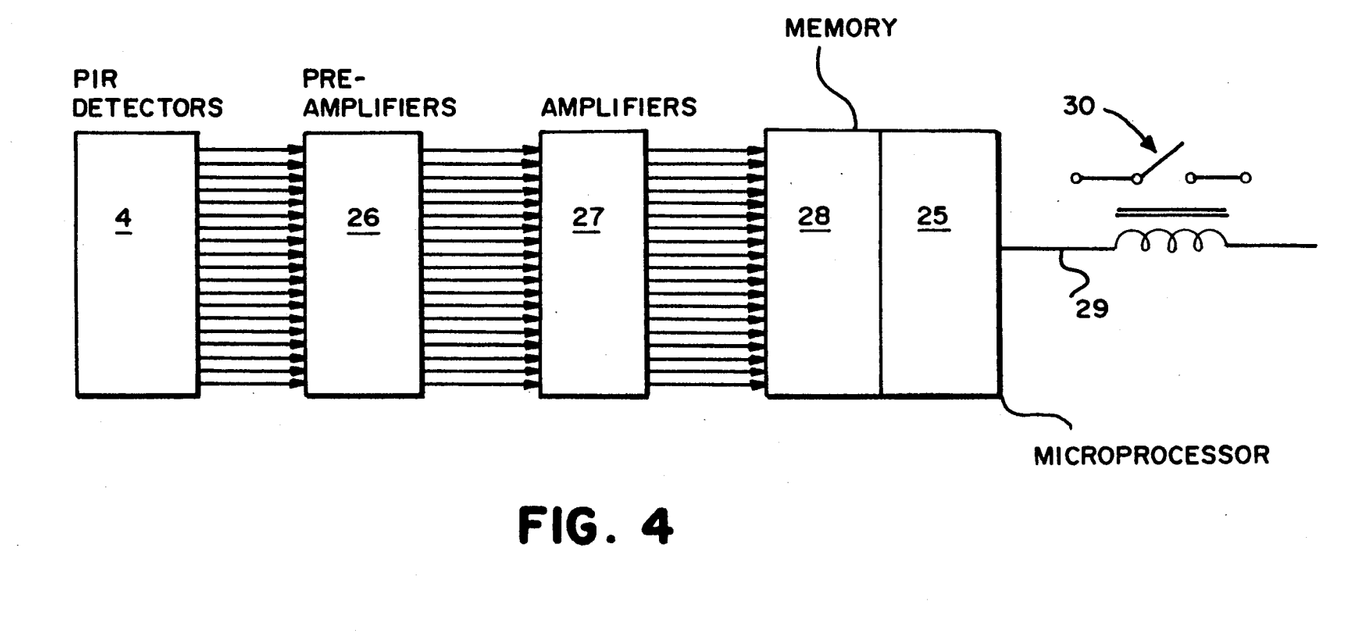
FIG. 4 is a block diagram schematically illustrating the electrical components, which further comprise the passive infrared radiation detection device of FIG. 2.

Prior PIR detection devices were found to be heavily dependent upon the immunity of the employed PIR detector to various types of noise, since this in turn limited the amount of amplification which could be applied to the electrical signals which were being developed. However, in accordance with the present invention, this disadvantage is overcome in a manner which permits a high gain signal to be developed despite an electrically noisy environment, without a corresponding loss in the ability to detect an alarm condition, by applying "pattern recognition" techniques to the data stored within the microprocessor 25, rather than merely relying upon level detection techniques for detecting alarm conditions.

To this end, the microprocessor 25 is configured to periodically sample the condition of the array 3 of PIR detectors 4 at a desired repetition rate (e.g., a 200 millisecond rate). This rate can either be fixed, as is preferred during normal operating conditions, or varied to increase in the event of a potential alarm event (to obtain additional information for processing purposes). Each developed sampling will result in a series of signals (in this illustrative case, nineteen) for application to memory, at 28, in essence developing (i.e., acquiring) a series of "snapshots" of the room 1 at desired intervals. As a result, the memory portions 28 of the microprocessor 25 will be provided with ongoing information indicative of the condition of the various zones defined within the room 1 which is being monitored, in a matrix which corresponds to the various sections 11, 14, 17, 20 (and facets 12, 15, 18, 21) of the segmented lens 6.

This matrix can then be analyzed to account for variations in the condition of the room 1, preferably at a repetition rate which corresponds to the sampling rate previously described (e.g., every 200 milliseconds). A short acquisition period is presently considered desirable in order to minimize the potential for sporadic errors to be introduced into memory 28, which can result from noise (and which tend to be intermittent), digitally excluding the limiting effects of noise as a consequence of these repetitive samplings and the quick acquision periods which are employed.

The microprocessor 25 then operates to analyze the data residing in memory 28 in order to make a positive determination as to the nature of a specific pattern which has been detected. This is accomplished for each of the several snapshots acquired in sampling the series of PIR detectors 4 over time. Upon detecting an event indicating the presence of an intruder, a signal is developed at 29 which is then used to operate a normally open solenoid switch 30 (or equivalent), which can then serve to provide an alarm signal either locally, or to a remote monitoring facility.

The specifics of these processing steps involve the detection and comparison of energy levels (incident on a specific PIR detector) using numerical comparison techniques which are in themselves known and readily capable of implementation. However, it is the manner in which such data is then interpreted that achieves the specific improvements of the present invention, as follows.

The basic criteria for determining whether a detected pattern is indicative of an intruder, or of some other stimulus, is whether the detected sampling of incident radiation includes emanations from two vertically adjacent segments of the room 1, corresponding to two "vertically adjacent" locations in memory 28, which initially persist and then move together. If it is determined that two or more vertically adjacent segments are producing infrared emanations (received by the corresponding PIR detectors), steps are taken to monitor and analyze subsequent samplings to detect persistence and subsequent movement. If so, a positive determination is then made that the detected event represents the image of an intruder (i.e., a person), and not some other acceptable stimulus (i.e., an existing light or heat source, a pet, etc.). All other stimuli are simply rejected as noise.

This, of course, depends upon a proper selection of the zones (segments) developed within the room, which will necessarily vary. However, by proper selection, this single determining factor (two vertically adjacent segments which initially persist and then move) is sufficient to make a positive determination of the presence of an intruder, as distinguished from other "legitimate" moving objects.

For example, assume that an image is detected within a single segment, which then moves for subsequent samplings. Since the detected image does not constitute two vertically adjacent segments, this is determined to constitute something other than an intruder, such as a pet or possibly a rodent. If an image is detected within two vertically adjacent segments, but the image does not move during subsequent samplings, the image is then deemed to be something other than an intruder since it does not move. Rather, the assumption is made that it is a stationary item, such as a lamp or a heat source. In the event that this detected, vertically adjacent pair of segments later moves, it will then be confirmed as an intruder and an alarm will be sounded. This therefore accounts for the possibility of an intruder entering the room, and then remaining stationary in an effort to defeat the security systems.

To be noted is that certain sources of noise will also be excluded by this basic detection criteria. For example, assume that a source of noise activates some of the PIR detectors, and that the activated detectors constitute a vertically adjacent pair. This will initiate the testing of subsequent samplings as previously described. However, since the detected noise will ordinarily continue for a relatively short period of time, the detected sampling will not be treated as an intruder since subsequent samplings will not continue to exhibit the necessary criteria (i.e., a persistent pair of vertically adjacent segments). To be noted is that this will also exclude the potential for false alarms resulting from the headlights of a passing automobile which might come to shine through a window of the room 1. An important limitation to note here is that if all the available segments, and accordingly all the PIR detectors 4, detect incident radiation for an extended period of time, the assumption is then made that this is not the result of passing headlights but rather is an attempt to defeat the security system by jamming, and an alarm is sounded.

As a result of the foregoing, false alarms due to noise or random individual events are effectively eliminated, and intruders become readily distinguishable from other moving objects such as pets and rodents, providing an effective PIR detection device 2 without concern to limiting parameters such as noise rejection and "catch" sensitivity.

The reliability of this system is still further enhanced by making accommodations for certain known, existing stimuli by creating "exceptions" to the above described testing procedures. For example, it is possible for hanging drapes to first excite more than one (vertically adjacent) segment, and to then move for a distance sufficient to constitute a positive test for an intruder in the room. This can be excluded by excepting movements which do not depart from a specific (predefined) region by more than a prescribed amount, or by excepting movements which are recurring and which therefore are not indicative of the positive movements which would be made by an intruder. Other exceptions can be fashioned for known (stationary) sources of light or heat.

Figure 5:
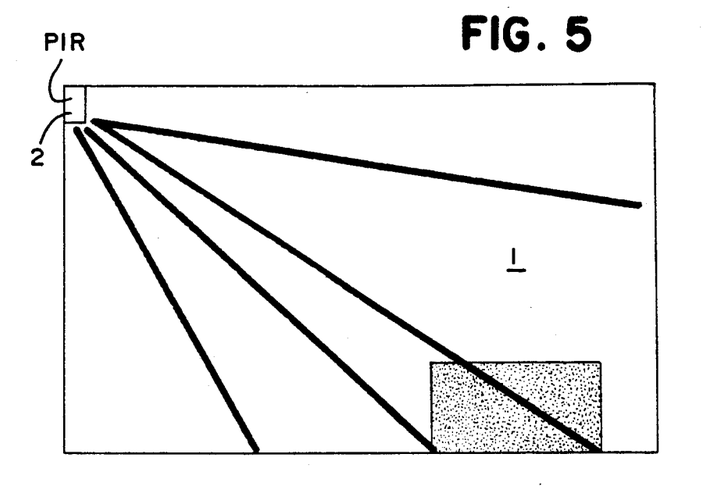
FIG. 5 is a schematic view of the protected region shown in FIG. 1, as viewed from the side, illustrating the development of a detection purposes.
Figure 6:
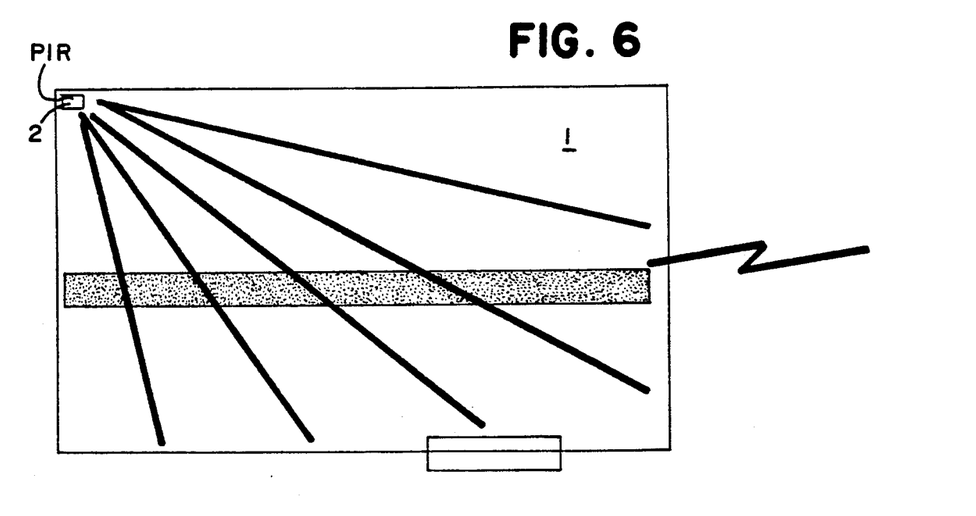
FIG. 6 is a schematic view of the protected region of FIG. 5, as viewed from the top.

Also to be considered are situations in which an intruder is crawling, or crouching low enough to avoid the excitation of two vertically adjacent segments, preventing an effective detection of the intruder. This can be corrected by modifying the foregoing analysis to include a "trap" for the detection of such situations. For example, and referring now to FIGS. 5 and 6 of the drawings, the segmented lens 6 of the PIR detection device 2 can be configured so that two of the four lens sections 11, 14, 17, 20 are positioned to simultaneously detect vertical and horizontal movements of an object of a size corresponding to that of a crawling or crouching person. Suitable comparisons are then made against subsequently obtained samplings to detect the presence of an intruder upon the detection of signals corresponding to the desired exception. In such case, care must be taken to make sure that the programmed model for a crawling or crouching person will exclude relatively large (tall) pets, to avoid false alarms in such cases.

Figure 7:
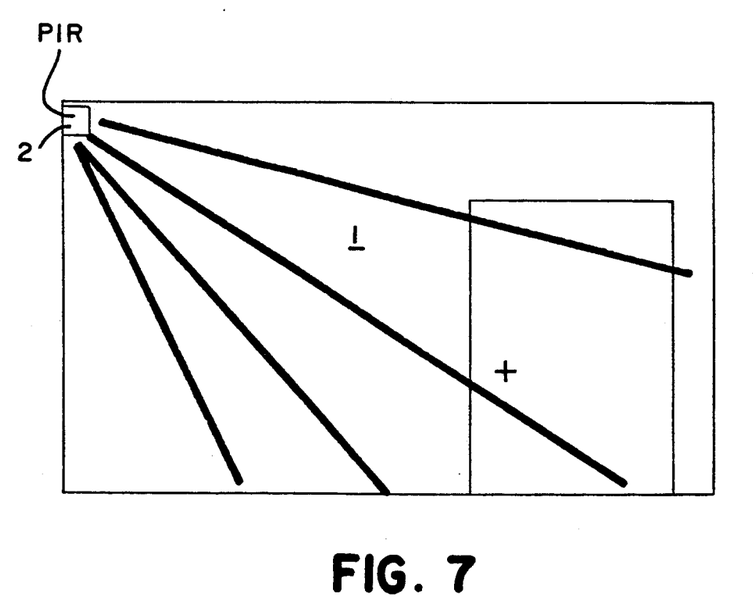
FIG. 7 is a schematic view of the protected region shown in FIG. 1, as viewed from the side, illustrating the monitoring of entry points.

Yet another special consideration is illustrated with reference to FIG. 7 of the drawings, and relates to the accommodation of entry points such as windows and doors. Again, by properly configuring the segmented lens 6 of the PIR detection device 2, steps can be taken to dedicate a specific facet (or facets) of the segmented lens to the specific entry point which is to be monitored. If desired, special steps may be taken to specifically monitor the associated PIR detector 4, to more positively monitor the corresponding entry point (e.g., at a higher sampling rate). This monitoring may be accomplished either separately, or in conjunction with the overall processing steps achieved in accordance with the present invention, as desired.

Another significant benefit of the microprocessor-based PIR detection device 2 is the ability to readily configure the system to the specific room in which it will be used. This can include proper selection of the segmented lens 6, and the array 3 of PIR detectors 4 associated with the segmented lens 6, to accommodate differences in the room's structure. However, this can further include providing the PIR detection device 2 with a "learning" capability which initially causes the PIR detection device 2 to detect the ambient (normal) condition of the room, and to then "program" subsequent operations in accordance with this initially detected pattern. The learned pattern will then be compared with subsequent samplings made by the PIR detection device 2, as previously described, with subsequent deviations indicating the presence of an intruder (sounding an alarm).

It is important to note that the basic steps necessary for implementing a PIR detection device 2 with a learning capability are in and of themselves known, and can be accomplished with conventional logic circuitry and software. Essentially, all that is required is to call for the detection of an initial sampling (pattern), and to then store the sampled values in memory for subsequent comparison purposes. Significant versatility is thus provided, in addition to the enhanced capabilities of the PIR detection device 2 which have previously been described.

Further to be noted is that different types of testing of the above-described "pre-programmed" or "learned" patterns may be employed in accordance with the present invention, depending upon the particular application involved. For example, it is possible for the PIR detection device 2 to search for a specific (or previously learned) pattern, and to ignore other patterns. If the specific (learned) pattern is assumed, an alarm is then sounded. Alternatively, the PIR detection device 2 can search for the specific (learned) pattern and then search for deviations, resulting in the sounding of an alarm. Combinations of these two modes are also possible.

One important application for a PIR detection device 2 which is capable of learning a specific pattern is that of the hospital ward. In many cases, critically ill people are not supposed to move to a significant degree, or get our of their beds. Also of importance is to determine whether a patient has fallen from their bed. Previously, it was conventional practice to utilize a significant number of hospital personnel to monitor patients to avoid such occurrences. This also applies to situations in which visitations are not permitted, and to avoid unauthorized entries into secured areas. The PIR detection device 2 of the present invention is particularly well suited to accommodating these needs, as follows.

During day-time hours, when hospital personnel can be expected to move in and out of a patient's room on a regular basis, it is of primary importance to monitor only the patient's position relative to the bed, and not the surroundings. In such case, the PIR detection device 2 will be configured to search for (or would learn) the specific pattern normally assumed by the patient while in bed, and to ignore other detected events. During night-time hours, or in the case of the critically ill, it becomes important to search for visitors or other unauthorized personnel not permitted in the patient's room. In such case, the PIR detection device 2 will be configured to search for samplings which depart from the initially configured (or learned) pattern, signalling the presence of an intruder. Other night-time situations may involve patients which can move, but are not supposed to. This can be monitored in similar fashion to the day-time mode previously described. What is more, combined operations (combining the two available night-time modes) could be developed to accommodate both of these needs, by appropriately segmenting operations within the microprocessor 25.

It will therefore be understood that various changes in the details, materials and arrangement of parts which have been described and illustrated in order to explain the nature of this invention may be made by those skilled in the art within the principle and scope of the invention as expressed in the claims which follow. Some of these variations have previously been discussed, including variations in the array of PIR detectors (e.g., in number), and the segmented lens (e.g., in the number of segments, the number of facets per segment, or in the shape of the segmented lens or its respective segments and facets), to accommodate variations in the region (room) which is to be monitored, and to enhance the system's sensitivity. Also clearly capable of variation are the specific processing steps implemented by the microprocessor 25 to analyze the information which is received, including both variations in the rate at which data is sampled, as well as the specific testing steps which are used to determine the presence of an intruder and to distinguish

What is claimed is:

1. An apparatus for detecting movement in a defined region, comprising:
   a plurality of passive infrared radiation detection devices positioned in an array; and
   lensing means for receiving infrared radiation from discrete zones of said defined region, and for directing said received infrared radiation to detection devices of said array;
   wherein said lensing means is configured for delivering infrared radiation received from different zones of said defined region to different detection devices of said array, and includes a facetd mirror for receiving infrared radiation, and a mirror for receiving infrared radiation from said faceted mirror for direction toward said array of detection devices.

2. The apparatus of claim 1 wherein each of said detection devices receives infrared radiation from a different one of said zones.

3. The apparatus of claim 1 wherein facets of the faceted mirror are positioned at differing angles for delivering infrared radiation received from the zones of said region to the detection devices of said array.

4. The apparatus of claim 3 wherein said facets are disposed in a series of vertically adacent rows corresponding to different portions of said region.

5. The apparatus of claim 4 wherein said rows include an increased number of facets for receiving infrared radiation from lower portions of said region.

6. An apparatus for detecting movement in a defined region, comprising:
   a plurality of passive infrared radiation detection devices positioned in an array;
   lensing means for receiving infrared radiation from discrete zones of said defined region, and for directing said received radiation to detection devices of said array, wherein said lensing means is configured for delivering infrared radiation received from different zones of said defined region to different detection devices of said array; and
   means for interpreting electrical signals received from said detection devices responsive to infrared radiation received from the zones of said region, wherein said interpreting means includes means for recognizing specified patterns corresponding to specified alarm conditions, and means for sequentially analyzing periodic samplings at a selected rate.

7. The apparatus of claim 6 wherein said interpreting means includes means for amplifying said electrical signals, means for converting said amplified electrical signals to digital form, and means for processing said electrical signals in digital form.

8. The apparatus of claim 6 wherein said selected rate is approximately once every 200 milliseconds.

9. The apparatus of claim 6 wherein said specified patterns include patterns in which infrared radiation is simultaneously detected in a specified zone of said region by a plurality of said detection devices for monitoring said specified zone.

10. The apparatus of claim 6 wherein said interpreting means includes means for configuring said apparatus to monitor a a selected region.

11. The apparatus of claim 10 wherein said configuring means includes means for monitoring said detection devices to develop a plurality of reference signals corresponding to said selected region, and means for storing said reference signals for comparison with subsequently detected levels of infrared radiation.

12. The apparatus of claim 11 wherein an alarm is declared if said subsequently detected levels of infrared radiation correspond to said reference signals.

13. The apparatus of claim 11 wherein an alarm is declared if said subsequently detected levels of infrared radiation depart from said reference signals.

14. An apparatus for detecting movement in a defined region, comprising:
   a plurality of passive infrared radiation detection devices positioned in an array;
   lensing means for receiving infrared radiation from discrete zones of said defined region, and for directing said received infrared radiation to detection devices of said array, wherein said lensing mans is configured for delivering infrared radiation received from different zones of said defined region to different detection devices of said array; and
   means for interpreting electrical signals received from said detection devices responsive to infrared radiation received from the zones of said region, wherein said interpreting means includes means for recognizing specified patterns corresponding to specified alarm conditions, and wherein said specified patterns include patterns in which infrared radiation is detected in two vertically adjacent zones of said region, which initially persist and then move in unison.

15. The apparatus of claim 14 wherein said specified patterns exclude patterns in which infrared radiation is detected in two vertically adjacent zones of said region, which do not persist and then move in unison.

16. The apparatus of claim 15 wherein said specified patterns exclude patterns in which said movement does not exceed a prescribed amount.

17. The apparatus of claim 15 wherein said specified patterns exclude patterns in which said movement is recurring.

18. A method for detecting movement in a defined region, comprising the steps of:
   detecting levels of infrared radiation received from different zones of said defined region;
   determining when said detected levels of infrared radiation develop a specified pattern; and
   declaring an alarm only when said specified pattern is determined to be present;
   wherein said detecting and said determining is periodically performed.

19. The method of claim 18 wherein said detecting and said determining is performed approximately once each 200 milliseconds.

20. The method of claim 18 wherein said specified pattern includes patterns in which infrared radiation is simultaneously detected in a specified zone of said region by a plurality of said detection devices for monitoring said specified zone.

21. The method of claim 18 which further includes configuring an apparatus for detecting the movement in said defined region prior to said detecting and said determining.

22. The method of claim 21 wherein said configuring includes the steps of monitoring said defined region to develop a reference standard, and storing said reference standard for comparison with subsequently detected levels of infrared radiation.

23. The method of claim 22 which further includes declaring an alarm if said subsequently detected levels of infrared radiation correspond to said reference standard.

24. The method of claim 22 which further includes declaring an alarm if said subsequently detected levels of infrared radiation depart from said reference standard.

25. A method for detecting movement in a defined region, comprising the steps of:

detecting levels of infrared radiation received from different zones of said defined region;

determining when said detected levels of infrared radiation develop a specified pattern; and declaring an alarm only when said specified pattern is determined to be present;

wherein said specified pattern includes patterns in which infrared radiation is detected in two vertically adjacent zones of said region, which initially persist and then move in unison.

26. The method of claim 25 wherein said specified pattern excludes patterns in which infrared radiation is detected in two vertically adjacent zones of said region, which do not persist and then move in unison.

27. The method of claim 26 wherein said specified pattern excludes patterns in which said movement does not exceed a prescribed amount.

28. The method of claim 26 wherein said specified pattern excludes patterns in which said movement is recurring.

* * * * *